United States Patent Office 3,618,320
Patented Nov. 9, 1971

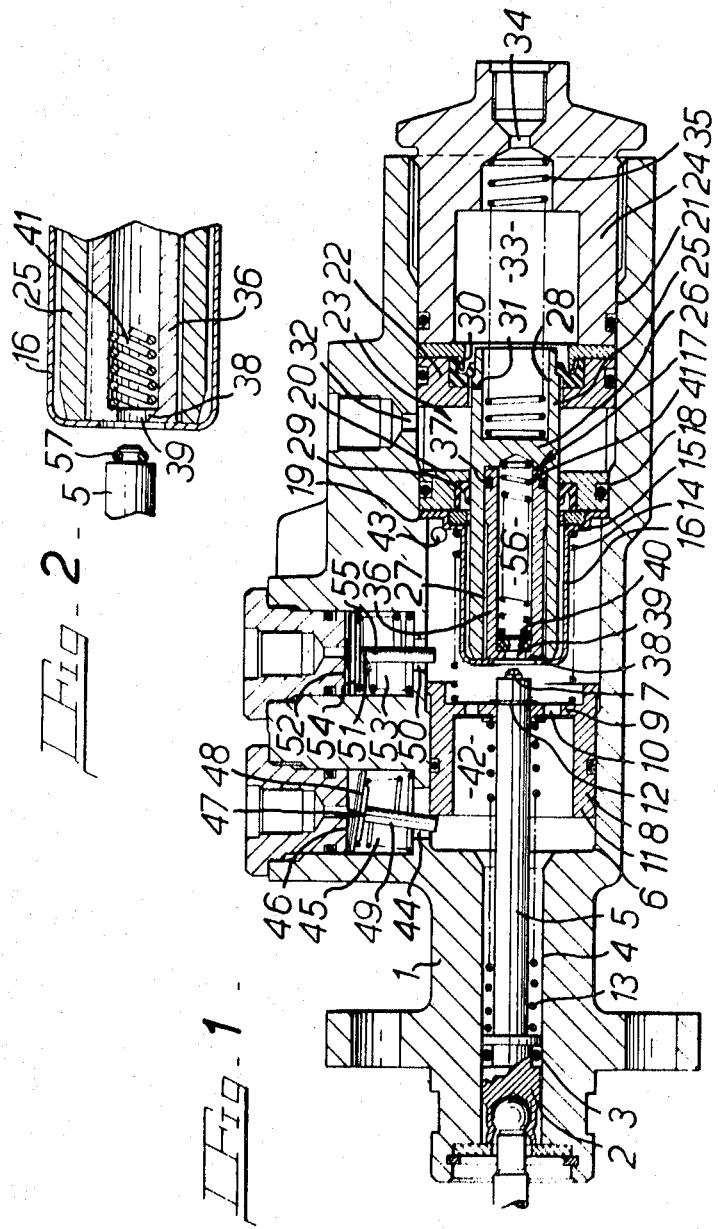

3,618,320
HYDRAULIC BRAKING SYSTEMS FOR VEHICLES
Brian Ingram, Warwickshire, England, assignor to Girling Limited, Birmingham, England
Filed Mar. 10, 1970, Ser. No. 18,039
Claims priority, application Great Britain, Mar. 28, 1969, 16,377/69
Int. Cl. F15b 7/00
U.S. Cl. 60—54.6
9 Claims

ABSTRACT OF THE DISCLOSURE

A power-operated tandem master cylinder includes first and second pressure spaces located respectively between a main piston and a secondary piston, and between the secondary piston and a closed end of the cylinder bore in which the pistons work. The secondary piston comprises a telescopic assembly of which the length increases progressively as the secondary piston is advanced in the cylinder bore under the influence of pressure fluid in the first pressure space. This maintains at a substantially constant minimum, the distance between an axial extension carried by the main piston and the adjacent end of the secondary piston with which the axial extension engages upon failure of at least the first pressure space.

---

This invention relates to improvements in hydraulic braking systems for vehicles of the kind in which slave cylinders for actuating brakes of primary and secondary brake circuits are supplied with fluid under pressure from a pump or other source of pressure fluid under the control of a master cylinder actuated by a pedal. More particularly, our invention is concerned with a new or improved master cylinder for use in an hydraulic braking system of the kind set forth.

In the complete specification of our U.S.A. pat. appln. No. 833,329, dated June 16, 1969, we have described and claimed a master cylinder for use in an hydraulic braking system of the kind set forth comprising a cylinder body, a positively actuated first piston axially movable in a bore in the cylinder body, a secondary piston located in the bore between the first piston and one end of the cylinder body, a first pressure space in the cylinder body, defined at least in part between the first piston and the secondary piston and adapted to be connected to slave cylinders of a primary brake circuit, a first passage in the cylinder body adapted to be connected to a pressure source and opening into the first pressure space, a normally closed first valve controlling the first passage, a second passage in the cylinder body adapted to be connected to a reservoir for the pressure source and leading into the first pressure space, a normally open second valve controlling the second passage, a second passage space between the secondary piston and the said one end of the cylinder body and adapted to be connected to slave cylinders of a secondary brake circuit, a third passage in the cylinder body adapted to be connected to a reservoir for fluid, and a normally open third valve controlling communication between the third passage and the second pressure space, the arrangement being such that a small forward movement of the first piston effects closure of the second valve and effects opening of the first valve to permit fluid from the pressure source to flow to the slave cylinders of the primary piston which advances towards the said one end of the cylinder bore, closing the third valve and thereafter supplying fluid under pressure to the slave cylinders of the secondary brake circuit.

When the master cylinder is incorporated in a braking system of the kind set forth, in the normal application, the output pressures to the primary and secondary brake systems increase proportionally with increase in the actuating force, suitably pedal effort, applied to the first piston until the output pressure to the primary brake circuit is equal to that of the pressure of the fluid pressure source. Further pedal-effort applied to the first piston merely advances the main piston in the cylinder bore, without increasing the output pressure and without any additional resistance to pedal effort. Added resistance to pedal-effort with increased output pressure to the secondary brake circuit occurs only when an axial extension, associated with and extending beyond the inner end of the first piston, has been advanced in the bore by a distance sufficient for it to co-operate with an adjacent end of the secondary piston. During the period between the application of output pressure to the primary brake circuit and the co-operation of the axial extension with the secondary piston, there is a complete absence of pedal control or "feel" of the braking operation.

Furthermore, in the event of failure of fluid pressure source or the first pressure space, upon advancing the first piston further in the bore, the axial extension associated with and extending beyond the inner end of the first piston co-operates with the secondary piston to advance the secondary piston in the bore whereby pressure is developed in the second pressure space for applying the brakes of the secondary brake circuit.

Should failure of the supply of pressure fluid or the first pressure space occur when the system is pressurized, the secondary piston will be in an advanced position in the bore and the inner end of the axial extension will be spaced from the secondary piston by a substantial distance. In order to co-operate with the secondary piston, the axial extension has to be advanced by a substantial distance sufficient to increase further the pressure of the hydraulic fluid in the secondary pressure space. Under these conditions the pedal will fall away from the operator and braking "feel" will only be provided when the axial extension actually co-operates with the secondary piston as described above.

According to our present invention in a master cylinder as claimed in the complete specification of our U.S. pat. appln. No. 833,329 dated June 16, 1969 an axial extension associated with the one piston is adapted to co-operate with the other piston upon failure of at least the first pressure space, and one of the pistons forms part of a telescopic assembly of which the effective length is adapted to be increased in a range between a contracted position and an extended position as the secondary piston is advanced in the cylinder bore when subjected to hydraulic fluid pressure in the first pressure space, the axial extension normally being spaced from the adjacent end of the said other piston by a minimum distance throughout the range of extension of the telescopic assembly to reduce to a minimum movement of the first piston which is required to effect co-operation of the axial extension with the said other piston upon failure of at least the first pressure space, and means being provided for preventing contraction of the telescopic assembly when the axial extension co-operates with the said other piston to enable the secondary piston to be advanced in the bore.

Preferably the secondary piston comprises a telescopic assembly comprising an outer piston working in a part of the cylinder bore and provided with an axial bore closed at its inner end in which works an inner piston having a closed outer end in which is formed a central opening through which hydraulic fluid enters the inner piston from the first pressure space, and a spring acts between the inner and outer pistons to urge the pistons relatively away from each other, the movement of the inner piston relative to the outer being controlled by stop means maintaining a predetermined clearance between the inner end of the axial extension, which is carried by the first piston, and the inner piston when the first pressure space is pressurized and relative to which the axial extension is movable upon failure of at least the first pressure space to close the opening in the inner piston and trap a column of hydraulic fluid in a chamber defined between the inner and outer pistons whereafter further movement of the axial extension in the same direction advances the inner and the outer pistons together as a substantially rigid strut assembly due to the interposition of the column of hydraulic fluid.

The inner end of the axial extension may be formed with a nose portion of reduced diameter adapted to be sealingly received within an annular sealing ring in the closed end of the inner piston and of an internal diameter slightly less than the diameter of the opening in the inner portion. Alternatively, the ring may surround and embrace the nose portion and engage with a seating surrounding the opening in the outer end of the inner piston.

In another construction the axial extension may be provided in its inner end with a recess in which is received a resilient seal adapted to engage with and seal against a seating in the outer end of the inner piston surrounding the opening.

Some embodiments of our invention are illustrated in the accompanying drawings in which:

FIG. 1 is a longitudinal section of a pedal operated master cylinder in one convenient form;

FIG. 2 is a longitudinal section on an enlarged scale of a portion of the master cylinder illustrated in FIG. 1, but showing a modification.

Figure 3:
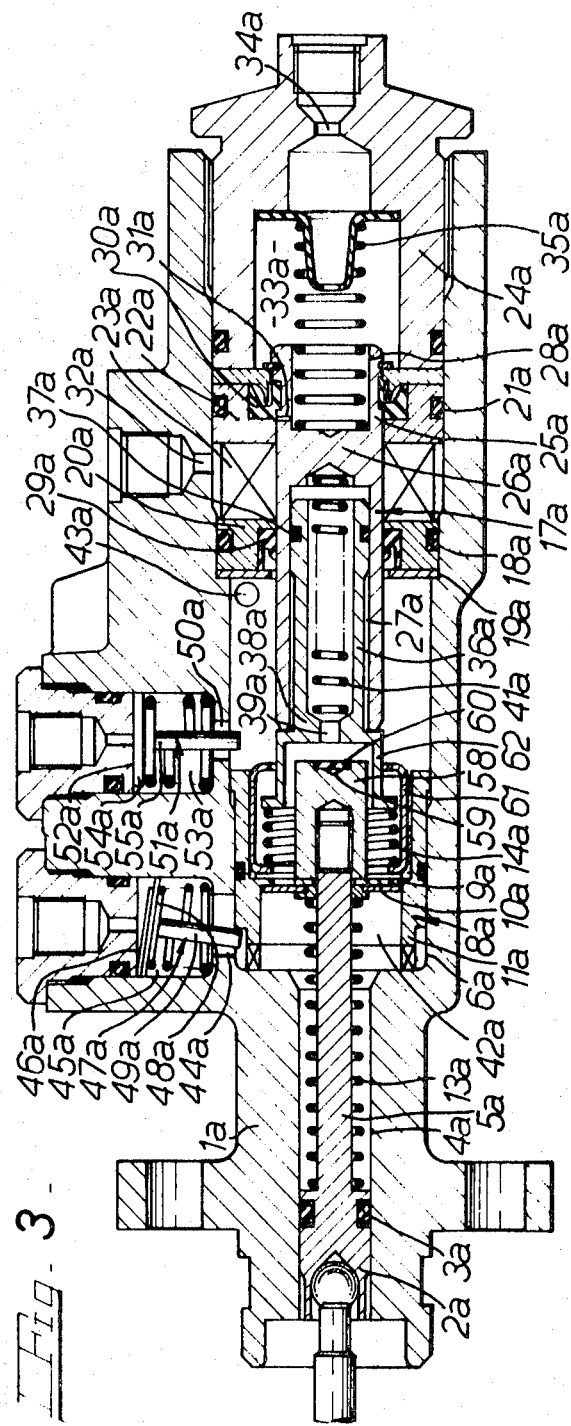
FIG. 3 is a longitudinal section of a master cylinder similar to that illustrated in FIG. 1 but including some modifications.

The master cylinder illustrated in FIG. 1 comprises a body 1 having a stepped longitudinal bore. A first piston 2 provided with a seal 3 works in the portion 4 of the bore of smaller diameter and is provided with an axial extension 5 in the form of an imperforate rod. The rod 5 extends into the portion 6 of the bore of greater diameter and terminates at its inner end in a nose portion 7 of reduced diameter.

A cage assembly 8 slidably mounted on the imperforate rod 5 at an intermediate point in its axial length includes a radial flange 9 provided with a plurality of ports 10 and an annular shroud 11 extending axially in opposite directions with respect to the flange 9 and working in the bore portion 6. The inner face of the flange 9 is held in abutment with a collar 12 on the rod by a compression spring 13 acting between the first piston 2 and the flange 9 of the cage assembly 8. The cage assembly 8 together with the rod 5 and the first piston 2 are normally held in the position shown by a return spring 14 acting between the flange 9 and an outwardly extending flange 15 on the inner end of an abutment stop 16 of top-hat section enclosing the adjacent end of a secondary piston assembly 17.

The portion 6 of the stepped bore is counterbored at 18 from its outer end and a shoulder 19 at the step in diameter forms an abutment for an annular ring 20. The counterbored portion 18 is counterbored again at 21 to form a location for a second annular ring 22 which is spaced from the first by a spider or similar member 23, integral with the ring 22. The rings 20 and 22 are clamped in position by a plug 24 screwed into the outer end of the counter-bore 21.

The secondary piston assembly 17 is in the form of a telescopic assembly which is slidably received in aligned central openings in the rings 20 and 22. The secondary piston assembly 17 comprises an outer piston 25 in the form of a hollow sleeve provided with an inner end portion of reduced diameter. A partition 26 closes the bore of the sleeve 25 at an intermediate point in its axial length to divide the bore into a blind bore 27 adjacent to the rod 5 and a recess 28 on the opposite side of the partition 25.

Each ring 20, 22 is formed in its inner peripheral edge with an annular recess in which is housed a seal, 29 and 30 respectively, each having a continuous radial lip. The lip of the seal 29 is in sealing engagement with the outer peripheral wall of the outer piston 25 at all times. In the inoperative position shown a port 31 in the wall of the outer piston 25 provides a communication between a radial port 32 in the wall of the body for connection to a hydrostatic reservoir for hydraulic fluid, and a pressure space 33 between the inner end of the outer piston 25 and an outlet portion 34 in a plug 24 closing the inner end of the body 1. The outlet port 34 is adapted to be connected to slave cylinders of a secondary brake circuit of a vehicle. The outer piston 25 is held in the retracted position shown in the drawings by a compression spring 35 acting between the plug 24 and the partition 26 at the base of the recess 28.

An inner piston 36 working within the blind bore 27 carries a seal 37 which has a sealing engagement with the wall of the bore 27. The inner piston 36 is hollow and is provided at its outer end with an inwardly extending radial flange 38 having a central opening 39 aligned with, and of a diameter slightly greater than, the nose portion 7 at the inner end of the rod 5. An annular sealing ring 40 is held against the inner face of the flange 38 by a compression spring 41 acting between the ring 40 and the partition 26 to urge the inner and outer pistons 25 and 36 in opposite directions away from each other. The compression spring 41 is of less strength than the return spring 14 acting on the inner piston 36 through the abutment stop 16 so that the inner piston 36, at its inner end, is held against the outer piston 25.

A first or primary pressure space 42 is located in the bore of the body 1 between the first piston 2 and the secondary piston assembly 17 and is adapted to be connected to the slave cylinders of the primary brake system of the vehicle through an outlet portion 43.

Communication between the first or primary pressure space 42 and a reservoir is adapted to be established in the off position of brakes, through a port 44 in the wall of the cylinder body 1 leading into a chamber 45 in which is mounted a valve seat 46 surrounding an opening adapted to be controlled by a spring loaded tilting valve 47. The valve 47 comprises a head 48 having an upper face adapted to engage with the valve seat 46. The head 48 is mounted on a stem 49 of which the lower end extends downwardly through the port 44 and into the path of the outer free end of the shroud 11 of the cage assembly 8. When the main piston 2 and the imperforate rod 5 are in their fully retracted positions illustrated, the shroud 11 engages with the lower end of the valve stem 49 to hold the valve 47 in a tilted position so that the first pressure space 42 is in free communication with the reservoir.

Communication between the first pressure space and a source of high pressure fluid, such as a pump or hydraulic accumulator, through a further port 50 in the wall of the cylinder body, is controlled by a further spring loaded tilting valve 51 co-operating with a valve seat 52 in a chamber 53 with which the port 50 communicates. The valve 51 comprises a head 54 having an upper face adapted to engage with the valve seat. The head 54 is mounted on a stem 55 of which the lower end extends downwardly through the port 50 into the path of the inner free end of the shroud 11 of the cage assembly 8. When the main piston 2 and the imperforate rod 5 are in their fully retracted positions, the shroud 11 is spaced by a short distance from the stem 55 so that, due to the spring loading, the head 54 is urged against the valve seat 52 to prevent fluid under pressure being supplied to the first pressure space 42 from the hydraulic supply.

The reservoir and the hydraulic accumulator or pump, which comprises the source of fluid under pressure, provide a closed circuit connected at opposite ends between the ports 44 and 50 in the wall of the cylinder body 1 controlled by the tilting valves 47 and 51 and a nonreturn valve is located in the line between the hydraulic accumulator or pump and the tilting valve 51 to prevent the return of hydraulic fluid from the pressure space 42 to the hydraulic accumulator or pump when the tilting valve 51 is open.

When a pedal connected to the first piston 2 is depressed to apply the brakes, with the high pressure source operative, the piston 2 and the imperforate rod 5 are moved forwardly through a small distance. Due to the force in the compression spring 13, the cage assembly 8 is moved with the rod 5 through a corresponding distance against the force in the compression spring 14. The shroud 11 moves out of contact with the stem 49 to allow the tilting valve 47 to close due to its spring loading. Thereafter a small additional forward movement of the cage assembly 8 opens the other tilting valve 51, by the engagement of its stem 55 with the inner free end of the shroud 11. This permits fluid from the high pressure source to enter the first pressure space 42 and to pass to the slave cylinders of the primary brake system of the vehicle through the outlet port 43. In this position the nose portion 7 at the free end of the rod 5 is spaced by a small distance from the annular sealing ring 40 in the inner piston 36 of the secondary piston assembly 17. Simultaneously, the high pressure fluid acts on the forward end of the outer piston 25 to advance it in the bore and this high pressure fluid also pressurises a chamber 56 between the communicating bores of the inner and outer pistons 25 and 36. Movement of the outer piston 25 is assisted by the compression spring 41, and the end portion of the outer piston 25 of reduced diameter sweeps through the seal 30 which in turn seals against the full diameter of the outer piston 25 at a position inwardly from the port 31 to cut off communication between the port 32 and the pressure space 33. Thereafter, upon further movement of the outer piston 25 in the same direction, fluid under pressure is delivered to the slave cylinders of the secondary brake system from the second pressure space 33 through the port 34.

In the event of failure of the high pressure source or the pressure space 42 when the brakes are being applied, the nose portion 7 of the imperforate rod 5 is spaced by a small distance from the annular sealing ring 40. In this position the cage assembly 8 is prevented from advancing further in the bore by the engagement of the shroud 11 with the stem 55 of the tilting valve 51 which acts as a stop. Further movement of the pedal causes the rod 5 to slide through the flange 9 against the force in the compression spring 13 and take up the small clearance between the rod 5 and the sealing ring 40 so that the nose portion 7 enters the opening 39 and seals with the sealing ring 40. The column of fluid in the inner piston 36 which is sealed between the rod 5 and the seal 40, forms a substantially incompressible strut whereby further movement of the rod 5 to advance the inner piston 36 causes the outer piston 25 to be advanced with it to deliver fluid under pressure from the second pressure space 33 to the secondary brake system.

The length of the column of hydraulic fluid within the chamber 50 is regulated substantially in accordance with the distance by which the outer piston 25 has been advanced in the bore relative to the inner piston 36. The provision of this hydraulic column ensured that the imperforate rod 5 is moved only a minimum distance to effect direct engagement with, and operation of, the secondary piston assembly 17 in the event of failure of the high pressure source or pressure space 42 or its associated primary brake circuit.

In the modifications shown in FIG. 2 the sealing ring 40 is omitted and an annular sealing ring 57 located in an annular recess in the nose portion 7 is adapted to seal against a seating in the outer face of the flange 38 when the nose portion 7 is inserted into the opening 39.

The construction and operation is otherwise the same as that described above with reference to FIG. 1 and corresponding reference numerals have been applied to corresponding parts.

The master cylinder illustrated in FIG. 3 is substantially identical with that described in FIG. 1 and reference numerals corresponding to those used in FIG. 1, but qualified by the suffix $a$, have been applied to corresponding parts.

In the construction shown in FIG. 3, the sealing ring 40 is omitted and the free end of the rod $5a$, which extends through the flange $8a$, carries an axially extending member 58 provided in its outer end with a central recess 59 in which is located, in alignment with the opening $39a$ in the inner piston $36a$, a circular resilient disc 60.

The operation of the construction illustrated in FIG. 3 is identical with that described above, except that when the imperforate rod $5a$ is advanced towards the inner piston $36a$, the disc 60 covers the opening $39a$ to seal the hydraulic column within the inner piston $36a$. Furthermore, a backstop for the main piston assembly is formed by an engagement between the outer end of the shroud $11a$ of the cage assembly $8a$ and the adjacent end of the cylinder body $1a$, whereas, in the embodiments of FIGS. 1 and 2 the backstop is formed by an engagement between the outer end of the main piston 2 and an abutment ring in the outer end of the cylinder bore.

In the embodiment of FIG. 3 as spring $14a$ is stronger than the spring $41a$ and holds the inner piston $36a$ against the adjacent end of the outer piston $25a$, the spring $14a$ acting between an annular collar 61 secured to the shroud $11a$ of the cage assembly 8 and an annular extension 62 on the adjacent end of the inner piston $36a$.

I claim:

1. In a master cylinder for use in an hydraulic braking system comprising a cylinder body, a positively actuated first piston axially movable in a bore in said cylinder body, a secondary piston located in said bore between the first piston and one end of said cylinder body, a first pressure space in the cylinder bore defined at least in part between said first piston and said secondary piston and adapted to be connected to slave cylinders of a primary brake circuit, a first passage in said cylinder body adapted to be connected to a pressure source and opening into said first pressure space, a normally closed first valve controlling said first passage, a second passage in the cylinder body adapted to be connected to a reservoir for the pressure source and leading into said first pressure space, a normally open second valve controlling said second passage, a second pressure space between said secondary piston and the said one end of the cylinder body and adapted to be connected to slave cylinders of a secondary brake circuit, a third passage in said cylinder body adapted to be connected to a reservoir for fluid, and a normally open third valve controlling communication between said third passage and said second pressure space, the arrangement being such that a small forward movement of said first piston effects closure of said second valve and effects opening of said first valve to permit fluid from said pressure source to flow to said slave cylinders of said primary brake circuit and apply pressure to said secondary piston which advances towards the said one end of the cylinder bore, closing said third valve and thereafter supplying fluid under pressure to said slave cylinders of said secondary brake circuit, the invention wherein an axial extension associated with one piston is adapted to co-operate with the other piston upon failure of at least said first pressure space, one of said first and second pistons constituting part of a telescopic assembly of which the effective length is adapted to be extended in a range between a first contracted position and a second extended position as said secondary piston is advanced in said cylinder bore when subjected to hydraulic fluid pressure in said first pressure space, said axial extension normally being spaced from said other piston by a minimum distance throughout extension of said telescopic assembly between said first contracted position and said second extended position, whereby movement of said first piston required to effect cooperation of said axial extension with said secondary piston upon failure of at least said first pressure space is reduced to a minimum, and means for preventing contraction of said telescopic assembly when said axial extension cooperates with the said other piston to enable said secondary piston to be advanced in said bore.

2. The invention as claimed in claim 1, wherein said axial extension is carried by said first piston, and said secondary piston defines said telescopic assembly comprising an outer piston working in a part of said cylinder bore and provided with an axial bore having an inner end, an inner piston working in said axial bore of said outer piston and having a closed outer end in which is formed a central opening through which hydraulic fluid enters said inner piston from said first pressure space, said inner and outer pistons defining therebetween a chamber of variable length, and a spring acting between said inner and outer pistons to urge said inner and outer pistons relatively away from each other, stop means for controlling said movement of said inner piston relative to said outer piston to maintain a predetermined clearance between said axial extension and said inner piston when said first pressure space is pressurised and relative to which said axial extension is movable upon failure of at least said first pressure space to close said opening in said inner piston and trap a column of hydraulic fluid in said chamber, whereafter, further movement of said axial extension in the same direction advances said inner and outer pistons together as a substantially rigid strut due to the interposition therebetween of said column of hydraulic fluid.

3. The invention as claimed in claim 2, wherein said inner end of the axial extension is formed with a nose portion adapted to be sealingly received within an annular sealing ring in said closed outer end of said inner piston and of an internal diameter slightly less than the diameter of said opening in said inner piston.

4. The invention as claimed in claim 3, wherein said nose portion comprises a portion of reduced diameter at said inner end of said axial extension.

5. The invention as claimed in claim 2, wherein said inner end of said axial extension is formed with a nose portion, and said nose portion carries a sealing ring which is adapted to seal against a seating surrounding said opening in said outer end of said inner piston.

6. The invention as claimed in claim 5, wherein said nose portion comprises a portion of reduced diameter at said inner end of said axial extension.

7. The invention as claimed in claim 2, wherein said axial extension carries a resilient seal adapted to engage with and seal against a seating surrounding said opening in the outer end of said inner piston.

8. The invention as claimed in claim 7, wherein said resilient seal is located in a central recess in said axial extension.

9. The invention as claimed in claim 1, wherein said axial extension comprises an imperforate rod extending axially from said first piston and carrying a cage assembly including an annular flange, and wherein said first and second valves comprise a pair of spring-loaded tilting valves adapted to be operated by said cage assembly, said rod projecting through said annular flange for engagement with said secondary piston.

References Cited

UNITED STATES PATENTS 2,992,533   6/1956   Hodkinson _____ 60—54.6 P

MARTIN P. SCHWADRON, Primary Examiner

A. M. ZUPCIC, Assistant Examiner

U.S. Cl. X.R.

60—54.6 E